Patented Sept. 27, 1932

1,879,239

UNITED STATES PATENT OFFICE

THOMAS PERCY HILDITCH, OF BIRKENHEAD, AND HAROLD JOSEPH WHEATON, OF HALE, ENGLAND, ASSIGNORS TO AMERICAN DOUCIL COMPANY, OF PHILADELPHIA, PENNSYLVANIA, A CORPORATION OF PENNSYLVANIA

MANUFACTURE AND PRODUCTION OF BASE-EXCHANGING COMPOUNDS

No Drawing. Original application filed August 13, 1923, Serial No. 657,206, now Patent No. 1,848,127. Divided and this application filed December 24, 1931. Serial No. 583,132.

This invention relates to the production of base-exchanging compounds, or gels, especially applicable to the purification and softening of water, but not necessarily limited thereto.

The present application is a division of our earlier application, Serial No. 657,206, filed August 13, 1923, now Patent 1,848,127 granted Mar. 8, 1932.

In the specifications of United States Letters Patent Nos. 1,381,777, issued June 14, 1921, and 1,586,764, issued June 1, 1926, are described and claimed the manufacture and production of base-exchanging compounds, in the case of the former patent, by treating a solution of silicate of sodium with an acid, so as to neutralize a portion of the sodium, and afterwards drying the gel and washing it to free it from soluble salt and, in the case of the latter patent, by the employment of solutions of sodium silicate and sodium aluminate in such proportions and under such conditions as to produce a base-exchanging compound on subsequent treatment analogous to that employed in the former case.

In the parent application above referred to, of which the present application is a division, we described the production of improved base-exchanging compounds by mixing with a solution of sodium silicate a solution of certain sodium compounds which may be defined as acidic sodium salts, or salts of complex, or condensed, acids (other than sodium aluminate) such as sodium pyroborate, or borax, sodium dichromate, sodium bicarbonate, sodium metaphosphate, sodium dihydrogen phosphate, sodium pyrosulphate, sodium bisulphate, or sodium bisulphite, such salts being alkali metal salts in which the simple metal oxide to acid anhydride ratio is smaller than the corresponding ratio in the normal alkali metal salt of the same constituents. This portion of our invention has been claimed in the said parent application above referred to.

The said parent application also disclosed the further improvement in the manufacture of base-exchanging compounds which involves mixing with the sodium silicate solution solutions of more than one other salt; such, for example, as solutions of sodium aluminate and sodium pyroborate, or of sodium aluminate and sodium dichromate, or of sodium pyroborate and sodium dichromate, or other combinations of the aforesaid salts. This portion of the invention is now claimed in the present divisional application as will be seen below in connection with the examples and the appended claims.

In connection with the entire invention, that is, the invention of the parent case as well as the invention of the present divisional application, it should be stated that the proportion to the sodium silicate of the sodium compound, or compounds, thus added will vary, according to the compound, or compounds, employed say from one molecular proportion of the acidic oxide of such added compound, or compounds, to form one molecular proportion to five molecular proportions of silica.

The concentration of the solutions may be, for instance, from about 15° to 26°, Twaddell for the solution of the added compound, or compounds, when the solubility of the compound in cold water permits. For compounds of comparatively low solubility a saturated solution may be used and the strength may be varied, for example, a convenient strength is up to 15° Twaddell (according to the constituents used) for each solution, or so that the stiff gel, resulting from the mixed solutions, contains between 5 and 15 percent of its weight of total solids.

Although we herein mention only sodium salts it is to be understood that, where it is available, potassium silicate can be used and also that where they are available, the corresponding potassium or ammonium, salts may be used to mix with the silicate as aforesaid. As, in using these other salts, it will be understood that the amount thereof chemically equivalent to the sodium salts will be used it is unnecessary to give examples of the use of the other salts.

In connection with that phase of our invention which is to be claimed in the present application, the following examples are given, and it is to be noted that the drying described in each example should be slowly and gently effected in a current of warm air so as to preserve as nearly as possible the physical structure. Furthermore, the washing step should be undertaken after the gel becomes hard, and we prefer to conduct the washing in a current of water to remove the soluble salts under which treatment it will break down from lumps into granules.

*Example 1*

Mix 2,400 parts of a solution of sodium silicate (containing 180 parts of silica and 60 parts of sodium oxide) with 6,000 parts of a solution containing 308 parts of crystallized borax and to this add immediately, (while well stirring), 1,600 parts of a solution of sodium aluminate containing 54 parts of alumina and 54 parts of sodium oxide. There will thus be produced a loose homogeneous gel, which is dried and washed as aforesaid.

*Example 2*

Mix 5,600 parts of sodium solicate solution (containing 266 parts of silica and 89 parts of sodium oxide) with 1,800 parts of a solution containing 136 parts of sodium carbonate and immediately mix the resulting mixed solutions with 1,600 parts of a solution containing 54 parts of alumina and 54 parts of sodium oxide. The product is a gel which is dried and washed as aforesaid.

*Example 3*

Mix, simultaneously, 5,400 parts of sodium silicate solution (containing 180 parts of silica and 60 parts of sodium oxide), 1,600 parts of sodium aluminate solution, containing 54 parts of alumina and 54 parts of sodium oxide, and 2,500 volumes of a solution, containing 240 parts of sodium dichromate. The resulting gel is dried and washed as aforesaid.

What we claim is:—

1. In the method of manufacturing a base-exchanging compound in the wet way, mixing a solution of an alkali-metal silicate with a solution of an alkali metal salt in which the simple alkali metal oxide to acid anhydride ratio is smaller than the corresponding ratio in the normal alkali metal salt of the same constituents and with a solution of sodium aluminate under conditions, proportions and degrees of concentration which result in the formation of a gel and then in drying the gel so produced.

2. In the method of manufacturing a base-exchanging compound in the wet way, mixing a solution of an alkali-metal silicate with a solution of an alkali metal salt in which the simple alkali metal oxide to acid anhydride ratio is smaller than the corresponding ratio in the normal alkali metal salt of the same constituents and with a solution of sodium aluminate under conditions, proportions and degrees of concentration which result in the formation of a gel and then in drying the gel so produced and in washing the dried product.

3. As a new article of manufacture the product of claim 1.

4. As a new article of manufacture the product of claim 2.

5. As a new article of manufacture, a base-exchanging compound which has been produced from a gel resulting from the mixture, under completely gelatinizing conditions, proportions and degrees of concentration, of a solution of an alkali metal silicate with a solution of an alkali metal salt containing one or more replaceable hydrogen atoms capable of combining with additional alkali metal and with a solution of sodium aluminate.

6. In the method of manufacturing a base-exchanging compound in the wet way, mixing a solution of sodium silicate with a solution of crystallized borax and with a solution of sodium aluminate under conditions, proportions and degrees of concentration which result in the formation of a gel and then in drying the gel so produced.

7. In the method of manufacturing a base-exchanging compound in the wet way, mixing a solution of sodium silicate with a solution of crystallized borax and with a solution of sodium aluminate under conditions, proportions and degrees of concentration which result in the formation of a gel, in drying the gel so produced and in washing the dried product.

8. In the method of manufacturing a base-exchanging compound in the wet way, mixing a solution of sodium silicate with a solution of sodium bicarbonate and with a solution of sodium aluminate under conditions, proportions and degrees of concentration which result in the formation of a gel and then in drying the gel so produced.

9. In the method of manufacturing a base-exchanging compound in the wet way, mixing a solution of sodium silicate with a solution of sodium bicarbonate and with a solution of sodium aluminate under conditions, proportions, and degrees of concentration which result in the formation of a gel and then in drying the gel so produced and finally in washing the dried product.

10. In the method of manufacturing a base-exchanging compound in the wet way, mixing a solution of sodium silicate with a solution of sodium dichromate and with a solution of sodium aluminate under condition, proportions and degrees of concentration which result in the formation of a gel and then in drying the gel so produced.

11. In the method of manufacturing a base-exchanging compound in the wet way, mixing a solution of sodium silicate with a solution of sodium dichromate and with a solution of sodium aluminate under conditions, proportions and degrees of concentration which result in the formation of a gel and then in drying the gel so produced and finally in washing the dried product.

In testimony whereof we have hereunto signed our names.

T. P. HILDITCH.
HAROLD J. WHEATON.

CERTIFICATE OF CORRECTION.

Patent No. 1,879,239.  September 27, 1932.

THOMAS PERCY HILDITCH ET AL.

It is hereby certified that error appears in the printed specification of the above numbered patent requiring correction as follows: Page 2, line 27, for "carbonate" read bicarbonate; and that the said Letters Patent should be read with this correction therein that the same may conform to the record of the case in the Patent Office.

Signed and sealed this 29th day of November, A. D. 1932.

(Seal)

M. J. Moore,
Acting Commissioner of Patents.